United States Patent [19]
Parton

[11] Patent Number: 5,690,825
[45] Date of Patent: Nov. 25, 1997

[54] FILTRATION METHOD AND APPARATUS

[75] Inventor: Adrian Parton, Exning, England

[73] Assignee: Genera Technologies Limited, Cambridge, England

[21] Appl. No.: 669,278

[22] PCT Filed: Dec. 21, 1994

[86] PCT No.: PCT/GB94/02782

§ 371 Date: Jun. 20, 1996

§ 102(e) Date: Jun. 20, 1996

[87] PCT Pub. No.: WO95/17238

PCT Pub. Date: Jun. 29, 1995

[30] Foreign Application Priority Data

Dec. 21, 1993 [GB] United Kingdom ............ 9326079
Nov. 22, 1994 [GB] United Kingdom ............ 9423688

[51] Int. Cl.⁶ .......... B01D 39/00; B01D 29/58; B01D 29/78; G01N 33/569
[52] U.S. Cl. .......... 210/350; 210/335; 210/489; 210/446; 435/34; 435/39; 435/246; 435/261; 435/297.1
[58] Field of Search .......... 210/350, 351, 210/352, 356, 335, 489, 446, 510.1; 435/34, 39, 261, 246, 297.1

[56] References Cited

U.S. PATENT DOCUMENTS

| | | |
|---|---|---|
| 1,367,325 | 2/1921 | Probst . |
| 3,747,769 | 7/1973 | Brumfield . |
| 3,935,111 | 1/1976 | Bentley . |
| 4,213,863 | 7/1980 | Anderson . |
| 4,302,310 | 11/1981 | Watson . |
| 4,303,533 | 12/1981 | Fremont . |
| 4,468,324 | 8/1984 | de Lappe . |
| 4,524,139 | 6/1985 | Fuchs . |

FOREIGN PATENT DOCUMENTS

| | | |
|---|---|---|
| 0 364 173 | 4/1990 | European Pat. Off. . |
| 2 177 316 | 1/1987 | United Kingdom . |
| 93/16383 | 8/1993 | WIPO . |
| 95/31726 | 11/1995 | WIPO . |

Primary Examiner—Thomas M. Lithgow
Attorney, Agent, or Firm—Cushman, Darby & Cushman IP Group of Pillsbury Madison & Sutro LLP

[57] ABSTRACT

An expansible, compressed foam is used as a filter medium and captured particulates are released from the foam by expanding the foam to open its pores. Micro-organisms such as Cryptosporidium or Giardia cysts may be trapped and recovered at high eficiency in a small volume of wash liquid easing further analysis. A foam filter element comprises thirty discs (36) of retriculated foam compressed between end plates (28,30) to about one tenth of their original thickness.

14 Claims, 1 Drawing Sheet

FILTRATION METHOD AND APPARATUS

This application claims benefit of international application PCT/ GB94/02782 filed Dec. 21, 1994.

The present invention relates to methods and apparatus for filtration and has particular but not exclusive relevance to the filtration of micro-particles from large volumes of liquid in which they are present at high dilutions.

Filtration of large volumes of liquid to capture and recover small particles such as micro-organisms poses a number of problems. Membrane filters tend to clog easily and so are only suitable for relatively small volumes of liquid containing particulates. Recovery can be difficult due to physical, electrostatic, or chemical trapping of the micro-particles on the filter membrane. Depth filters are therefore used to filter large volumes, or smaller volumes in which the solids content is high. These filters clog less easily, but full recovery of captured particles is difficult because the particles are trapped deep within the filter matrix.

An example of this problem occurs in the water industry in which, typically, 1000 liters of drinking water are filtered to test for the presence of oocysts of the parasitic protozoan Cryptosporidium. After filtering, the oocysts must be recovered for identification and counting. Current practice is to use a wound cotton fibre filter for this purpose. In order to recover the oocysts, the filter element is cut up into pieces, and the pieces are further shredded and the fibres are teased apart before a complex washing procedure can take place. This involves pounding the fibres, for example in a stomacher homogeniser, in the presence of a succession of volumes of washing liquid, typically three 1 liter aliquots. This large volume, when mixed with a further 1 liter of water that remains in the filter housing, poses problems in further processing to isolate the oocysts, in terms of the number of operations required and undesirable losses on the sides of containers. The washing procedure itself is inherently unsatisfactory because freed oocysts may become re-trapped during stomaching. Also, the washing procedure is time consuming and difficult to standardise, and therefore prone to operator induced variability.

A further example of this type of problem, from the water industry again but on a very different scale, is the treatment of sewage or other effluent by filtration. This is typically done in part by filtration through beds of media such as sand. When the filter medium has become loaded with filtered out particles, it is back-washed with large quantities of water, which is then stored in settling tanks to drop the particles as sludge before being recycled through the filtration process. It would be highly desirable to reduce the quantity of back-washing water, thus reducing pumping requirements and the size of the settlement tanks.

It is known from U.S. Pat. No. 4,213,863 to use pieces of uncompressed foam as a filter medium and no regenerate the filter medium by compressing it to drive out liquid and a portion of the captured solids from the foam. Whilst the foam will be partially cleared of captured particulates by this method and will be capable of further use in filtration, much of the captured particulate manner will remain trapped. Furthermore, if the pore size of the foam is sufficiently small no trap micro-organisms effectively, the total pore volume before compression will be small and the regeneration method will be only poorly effective.

GB-A-2177316 teaches the use of a reticulated foam as a filter element. The foam is compressed to reduce its effective pore size and the compression is locked in by heating the foam so than in will retain its compressed volume once the compressing force is removed. The filter is a substitute for a pleated paper oil filter and it is not intended that the particulates captured by the filter can be efficiently recovered.

The present invention provides filter apparatus comprising as a filter medium an expansible, compressed, open-cell, solid foam.

The foam is compressed so as to reduce its effective pore size to a level sufficient to achieve filtering out of the smallest particles whose removal is desired. The foam is expansible to increase the effective pore size once again so as to free filtered particles for easy removal from the foam. Generally, it will be possible to reuse the foam by recompressing it for further filtering activity.

The foam preferably has a dewindowed or reticulate structure which in its uncompressed state exhibits good liquid flow-through properties and cannot be considered capable of filtration of micro-organisms or other micro-particles in its uncompressed form. Suitable polymer foams are available made from a wide variety of plastics materials such as polyethers, polyesters, polypropylene, polyvinylchloride and polyurethanes. Preferred polymer foams are of from 50 to 200 ppi (pores per inch) (equivalent to 20 to 80 pores per cm) e.g. approximately 100 ppi (equivalent to 40 pores per cm).

Preferably, the filter medium comprises a stack of a plurality of filter elements of said foam stacked as layers upon one another and compressed in the direction of said stacking. Such filter elements may be cut from a sheet of the foam. Preferably, care is taken to avoid crushing the edges of each element in the cutting process, so that the porosity of the foam elements remains uniform.

Suitably, each element may be of from 0.1 to 10 cm thickness, more preferably from 0.5 to 2 cm thickness, e.g. about 1 cm thickness. The division of the filter medium into layers in this manner facilitates the even compression of the foam and also facilitates the washing of the foam once expanded.

Preferably, the filter apparatus comprises a first compression member and a second compression member located at opposite ends of said stack of filter elements, each of said first and second compression members being adapted to pass fluid to be filtered by said filter medium. The first and second compression members may be plates, e.g. apertured plates. They may be connected together by one or more rods passing through the filter medium. The securing of the compression members to the rod or rods serves to hold the foam in compression.

Preferably, the foam is compressed by a factor of from 5 to 20 in at least one direction. The compression direction is the direction of snacking where multiple layers of foam are employed.

More preferably, the compression factor is from 5 to 20, e.g. 10 to 15. That is say that preferably a stack of foam elements is compressed from an original height down to one tenth or one fifteenth of that height.

The depth of the filter medium in the apparatus can be varied depending upon the size of the target particle and the volume to be filtered but will typically be in the range of 0.1 to 20 cm for the isolation of particles for analysis and will generally be larger for process treatments such as the treatment of waste water, sewage or other effluent.

The degree of compression applied to the foam may be adjusted taking into account the initial foam porosity so as to provide an effective pore size sufficiently small to trap the desired particles.

Within the filter medium, filter elements may be provided stacked in layers which are of different starting porosities or compressibilities. In particular, one or more filter elements at the upstream end of the filter medium may have a relatively open porosity and one or more elements at or toward the downstream end of the filter medium may have a relatively fine porosity. By this means, the particles of interest may be trapped at a specific depth within the filter medium and extraction of the particles may take place exclusively from selected elements.

The invention includes a method of filtering particles from a fluid comprising passing said fluid containing said particles through a filter medium of expansible, compressed, open-cell, solid foam to trap said particles in said foam, releasing said foam from said compression and expanding said foam, and washing said particles out of said foam. Where the filter medium comprises a stack of elements as described above, the stack may be separated into individual filter elements or groups of filter elements which are washed separately to remove said particles therefrom.

Preferably, the ratio of the volume of liquid used to wash said particles from said filter medium to the volume of fluid filtered is 1:x wherein x is at least 10, preferably at least 100 and more preferably at least 1000.

The particles captured by the filtering method may then be subjected to an assay procedure to determine the presence of the particles, identify them or count them.

The particles may be micro-organisms such as Cryptosporidium oocysts or giardia cysts.

Where the filtration is carried out on a sample which contains larger particulate contaminants which need removal, e.g. prior to an assay to determine the numbers of a micro-organism present in the sample, a prefiltration may be carried out. This may be done using a conventional filter or may be done using a filter according to the invention in which the porosity of the foam and/or the degree of compression applied to it is adjusted or selected to remove the larger contaminants whilst passing the target species in the filtrate. Thus the prefilter may be a filter similar to than used for trapping the target species, but containing a lesser uncompressed depth of foam compressed to the same end depth. For a Cryptosporidium or giardia assay, a prefilter containing 20 to 60% of the foam content of the trapping filter but having the same dimensions is suitable.

Having been concentrated by the process of filtration described above the micro-organisms may be concentrated further, for instance by the procedure described in our copending Application No. GB9409348.1 or its family member WO 93/16383. In such a procedure, magnetically attractable particles having an affinity for the micro-organisms are attracted to a solid support and are then contacted with liquid containing the micro-organisms to capture the micro-organisms on to the particles on the solid support. The magnetic forces attracting the particles to the solid support are then removed so that the particles are released from the solid support into a still smaller volume of liquid.

The micro-organisms concentrated further by this method may then be subjected to analysis by electrorotation in the manner described in WO93/16383.

BRIEF DESCRIPTION OF THE DRAWINGS

The invention will be further described and illustrated with reference to the accompanying drawings and the following examples. In the drawings:

As shown in FIG. 1, filter apparatus according to the invention for use in a micro-organism assay comprises a filter housing 10 having a generally cylindrical body provided with a fixed conical outlet end 12 having an axially extending outlet tube 14. A cap 16 is provided an the inlet end having an axially extending inlet tube 18 and a pair of axially extending flanges 20, 22 defining a circular channel into which is received the inlet end of the cylindrical body 10 which is secured to the end cap 16 by a threaded connection and sealed by an O-ring 24. Within the housing is a filter element 26 according to the invention which is shown in more detail in FIGS. 2 and 3. It comprises an upstream compression member in the form of an apertured end plate 28 and a downstream compression member in the form of an apertured end plate 30 connected by a rod member in the form of a bolt 32 passing through a central aperture of each end plate and secured by a nut 34. Between the end plates are compressed approximately 30 circular discs 36 of reticulate foam each having an uncompressed thickness of approximately 1 cm and an uncompressed porosity of 100 ppi (40 pores per cm). These have been stacked over the end plane 28 and the bolt 32 and have been pushed down by the end plate 30 to compress the foam layers to an overall thickness of from 2 to 3 cm. Optionally, the foam layers include an upstream layer 38 of coarser porosity, or several such layers. Optionally, the foam layers include one or more downstream layers 40 of finer porosity.

Figure 1:
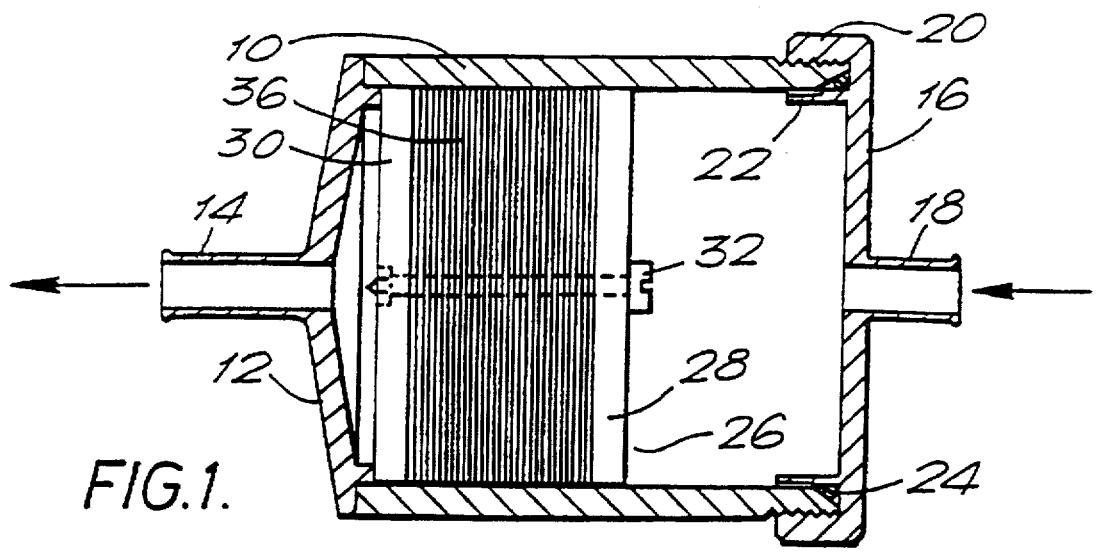
FIG. 1 is a sectional side elevation of filter apparatus according to the invention.
Figure 2:
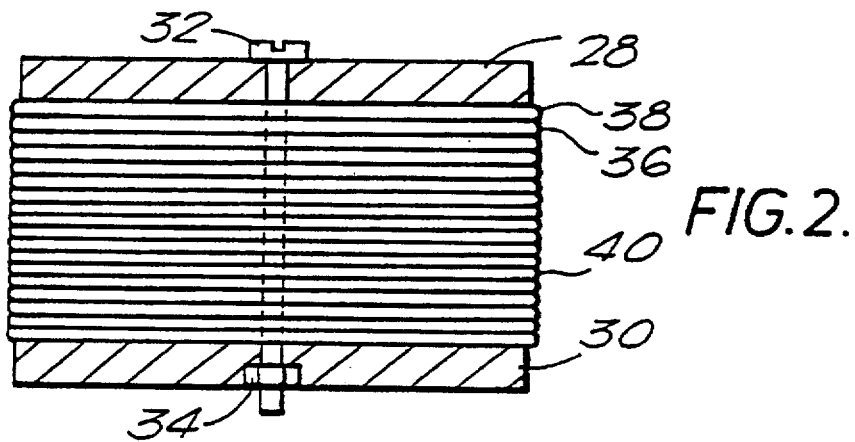
FIG. 2 shows in sectional side elevation a filter cartridge according to the invention as used in the apparatus of FIG. 1.
Figure 3:
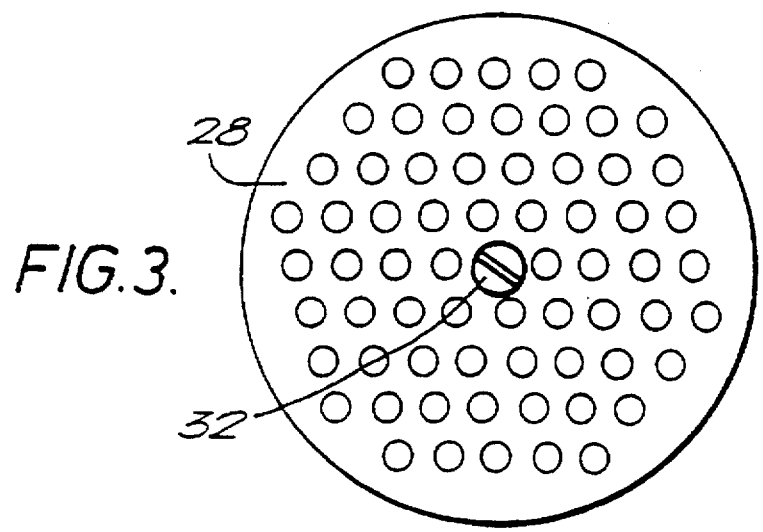
FIG. 3 is a plan view of the cartridge of FIG. 2.

The filter element shown in FIGS. 2 and 3 is pushed into the housing through the open inlet end prior to attachment of the end cap 16. By applying a small degree of extra compression to the foam discs by tightening the bolt 32, the foam discs may be caused to press tightly against the side wall 10 of the housing to foam a liquid-tight seal.

Another suitable arrangement for filter apparatus according to the invention is to place the foam, preferably as a stack of elements, in a tubular container having a support for the foam such as an apertured plate against which the foam is compressed by a plunger. The plunger may also be apertured to allow liquid to be passed through the compressed foam. The foam may be re-expanded and washed by movement of the plunger. Thus the foam may be placed in a housing in which one compression member constitutes a moveable wall of the housing by which the foam may be compressed.

In another alternative arrangement, liquid is passed through a compressed stack of foam elements transverse to the stacking direction.

The invention will be further illustrated by the following examples:

EXAMPLE 1

Recovery of polystyrene microspheres from a compressed foam filter

In this example 6 µm red beads were used to investigate efficiency of capture and release of particles of similar dimensions to oocysts. One ml of a suspension containing $2.25 \times 10^7$ beads per ml diluted into 3,000 ml of water was passed through a compressed foam filter as described above with reference to the drawings. The foam, which comprised a stack of 30 foam discs each punched from a sheet of 1 cm thickness foam, was then removed from the housing and the discs were washed in five batches of six discs each. Each batch was washed in 200 ml of water. The beads were collected by centrifugation, and enumerated using a haemacytometer slide. A total of $1.30 \times 10^7$ beads were recovered, representing a recovery efficiency of 57.8%. The majority of the beads were found in the uppermost two-fifths of the filter element.

EXAMPLE 2

The recovery of Cryptosporidium in River Water 10 liters of water from the River Severn at Tewkesbury, Gloucester was spiked with *Cryptosporidium parvum* (isolated from goat) to give a total load of $2.7 \times 10^5$ oocysts. The water sample was taken when the river was in flood and had a turbidity of 60–70 NTUs. The sample contained organic material including algal cells, and was not sterilised before use. The sample passed through a filter as describes in Example 1 without clogging. The filtrate was saved, and the number of oocysts found by filtering and immuno-fluorescent staining was $8 \times 10^4$ indicating a capture efficiency of 70%. After washing the foam, $7.3 \times 10^4$ oocysts were recovered. These data suggests that there was a recovery efficiency of 38.6%, of captured oocysts which compares favourably with recoveries reported using a wound cotton filter.

EXAMPLE 3

As in Example 2 10 liters of water from the River Severn at Tewkesbury, Gloucestershire were spiked with *Cryptosporidium parvum* oocysts (isolated from goat). The water samples were taken after a period of exceptionally heavy rainfall, and were of high turbidity (50–60 NTUs). The water also contained organic matter including algal material, and was not sterilised before use. The samples were pumped with a small peristaltic pump, through the filters as described above in Example 1, except that the discs were cut out rather than punched; no clogging of the filters was observed. Numbers of oocysts were estimated by passing samples through a membrane filter. The membranes were stained with fluorescent antibody and the oocysts enumerated under the microscope. Counts were performed on the spiked 10 liter sample before filtering, and on the filtrate.

The results are shown in the following table:

| Sample No. | No. oocysts in 10 liter sample before filtration | No. oocysts in filtrate | No. of oocysts captured by prefilter | Capture efficiency |
| --- | --- | --- | --- | --- |
| 1 | $4.05 \times 10^5$ | $2.8 \times 10^4$ | $3.77 \times 10^5$ | 93% |
| 2 | $4.05 \times 10^5$ | $5.0 \times 10^4$ | $3.55 \times 10^5$ | 88% |
| 3 | $4.05 \times 10^5$ | $1.5 \times 10^4$ | $3.90 \times 10^5$ | 96% |
| 4 | $4.05 \times 10^5$ | $1.5 \times 10^4$ | $3.90 \times 10^5$ | 96% |
| 5 | $4.05 \times 10^5$ | $4.0 \times 10^4$ | $3.65 \times 10^5$ | 90% |
| 6 | $4.05 \times 10^5$ | $2.0 \times 10^4$ | $3.85 \times 10^5$ | 95% |
| 7 | $4.05 \times 10^5$ | $4.5 \times 10^4$ | $3.60 \times 10^5$ | 89% |

These results demonstrate a high efficiency of trapping without the filter clogging, using 10 liters of highly turbid river water.

EXAMPLE 4

Using the method described above in Example 3, Cryptosporidium oocysts were spiked into 10 liters of turbid river water (50 NTU) and filtered. Following filtration, each filter disc was washed in a total volume of 400 ml 0.5% Tween-20. The washing process took approximately 10 minutes. The results for two runs are summarised below:

| | Run 1 | Run 2 |
| --- | --- | --- |
| No. of cysts in 10l sample before filtration | $20 \times 10^5$ | $1.7 \times 10^5$ |
| No. of cysts in filtrate | $3.8 \times 10^9$ | $1.6 \times 10^4$ |
| No. of cysts captured | $1.6 \times 10^5$ | $1.5 \times 10^5$ |
| Capture of efficiency | 81% | 90.6% |
| No. of cysts eluted | $1.2 \times 10^5$ | $1.2 \times 10^5$ |
| Recovery efficiency based on no. of oocysts in sample | 60% | 70.6% |

EXAMPLE 5

Using the method as described for Cryptosporidium, cysts or *Giardia intestinalis* were spiked into 10 liters of turbid river water and filtered. The cysts were eluted as described in Example 4. To estimate recovery of cysts from the filter, the number of cysts in the washings were counted. The result was as follows:

| | Expt. 1 | Expt. 2 |
| --- | --- | --- |
| No. of cysts in 10l sample before filtration | $8.0 \times 10^4$ | $8.3 \times 10^4$ |
| No. of cysts in filtrate | $2.0 \times 10^3$ | $1.0 \times 10^3$ |
| No. of cysts captured | $7.8 \times 10^4$ | $8.2 \times 10^4$ |
| Capture efficiency | 97.5% | 98.8% |
| No. of cysts eluted in washings | $7.7 \times 10^4$ | $5.7 \times 10^4$ |
| Recovery efficiency (cysts recovered as a percentage of cysts in 10l sample) | 96.3% | 68.7% |

Many modifications of the invention as described above are possible within the scope of the following claims.

I claim:

1. Filter apparatus comprising a foam filter medium which is an expansible, compressed, open cell, solid foam in the form of a stack of a plurality of filter elements of said foam stacked as layers upon one another and compressed in the direction of said stacking by a factor of at least 5.

2. Filter apparatus as claimed in claim 1, further comprising a first compression member and a second compression member located at opposite ends of said stack of filter elements, each of said first and second compression members being adapted to pass fluid to be filtered by said filter medium.

3. Filter apparatus as claimed in claim 2, wherein said compression members are connected by one or more rod members passing through said filter medium.

4. Filter apparatus as claimed in claim 1, wherein the foam is compressed by a factor of from 5 to 30 in at least one direction.

5. Filter apparatus as claimed in claim 4 wherein said foam is compressed by a factor of from 5 to 20 in at least one direction.

6. Filter apparatus as claimed in claim 1, further comprising a housing containing said filter medium and defining a flow path for fluid to be filtered which passes through said filter medium.

7. A method of filtering particles from a fluid comprising passing said fluid containing said particles through a filter medium comprising a stack of a plurality of filter elements of foam stacked as layers upon one another and compressed in the direction of said stacking by a factor of at least 5 to trap said particles in said foam, wherein said foam is an expansible, compressed, open cell, solid foam and said foam is released from said compression and expanded, and said particles are washed out of said foam.

8. A method as claimed in claim 7, wherein after said compression is released, the stack is separated into individual filter elements or groups of filter elements which are washed separately to remove said particles therefrom.

9. A method as claimed in claim 7, wherein the ratio of the volume of liquid used to wash said particles from said filter medium to the volume of fluid filtered is 1:x wherein x is at least 10.

10. A method as claimed in claim 9, wherein x is at least 100.

11. A method as claimed in claim 10, wherein x is at least 1000.

12. A method as claimed in claim 7, further comprising conducting an assay to determine the presence, identity, or number of said particles washed from said foam.

13. A method as claimed in claim 7, wherein said particles are micro-organisms.

14. A filter cartridge comprising a first compression member and a second compression member and compressed between said compression members by a factor of at least 5 as a filter medium a plurality of stacked layers of an expansible, compressed, open cell, solid foam.

* * * * *